United States Patent Office 3,442,959
Patented May 6, 1969

3,442,959
OXIDATION OF PARAFFINS TO PROVIDE ALCOHOLS
Gerald Sugerman, Fort Lee, N.J., assignor to Halcon International, Inc., a corporation of Delaware
No Drawing. Filed Aug. 6, 1964, Ser. No. 388,012
Int. Cl. C07c 29/12, 29/24
U.S. Cl. 260—639                                      8 Claims

ABSTRACT OF THE DISCLOSURE

The present invention relates to the molecular oxygen oxidation of paraffins having 10 to 30 carbon atoms and also containing aromatic hydrocarbons. Specifically, the oxidation of paraffins having 10 to 30 carbon atoms and acid and provides for the addition of boric acid during the oxidation in a prescribed fashion.

---

The present invention is concerned with a process for the preparation of alcohols from aliphatic hydrocarbons having 10 to 30 carbon atoms and more particularly to mixtures thereof. In this process, a finely divided solid boric acid compound is introduced into the reaction mixture in a programmed manner, whereby good conversion and selectivity to alcohol are obtained.

The oxidation of paraffinic hydrocarbons with molecular oxygen in the presence of boric acid or a lower hydrate, e.g., meta-boric acid, boron oxide or an ester, e.g., alkyl meta-borate, are known. Such oxidations lead to much higher selectivities to alcohols than the non-additive oxidations, which alcohols are mostly secondary and of the same number of carbon atoms as the starting hydrocarbon. The reaction product from a hydrocarbon oxidation in the presence of a boron compound contains unreacted hydrocarbon, borate esters, ketones, acids and esters as well as small amounts of other organic compounds and possibly unreacted boron compound.

The differences in boiling points between the hydrocarbon and the product alcohol and by-product ketone decrease with increasing molecular weight tending to make separation by distillation difficult. If the substrate is a mixture of hydracarbons e.g., a mixture of C–11, C–12, C–13 and C–14 paraffins, there is sufficient overlap among the boiling points of the hydrocarbons, product alcohols and by-product ketones, to make separation by distillation difficult.

Separation of the product alcohols can be achieved by distillation of the reaction product prior to hydrolysis whereby the borate esters of the product alcohols remain behind and all volatile components are taken overhead, e.g., unreacted hydrocarbon, ketones, acids and esters. The product alcohols can be recovered by hydrolysis of the borate esters and freed from residual acids and esters by treatment with caustic. The overhead fractions contain principally hydrocarbon contaminated with ketones, acids and esters. Separation by ordinary distillation of ketones from hydrocarbon is difficult in the case of a pure higher hydrocarbon and impossible with a mixture such as mentioned above. Extractive separation procedures, e.g., acid washing, are costly and unattractive commercially.

Since aromatics inhibit the oxidation of paraffinic hydrocarbons in the presence of 1% or more of boric acid, generally heretofore, aromatic content has been kept below 0.5% by costly acid treatment or the like to remove aromatic impurities in the charge stock.

The art is confronted with the problem of providing efficient alcohols production processes which minimize or avoid these disadvantages.

It has been found in connection with the invention that oxidation at a suitable rate can be achieved with low quantities of meta-boric acid, e.g., 0.5%. This is surprising since the solubility of meta-boric acid is extremely low in paraffin hydrocarbons and the solution is saturated with the boron compound (as it is if 1% or more is present). This effect appears to be related to the surface area of the solid boron compound. The beneficial effects of the boron can be achieved by programmed addition of the boron compound and still have a suitable rate of action. The rate at which the boron compound is added is critical and is dependent upon the extent of oxygen absorption (conversion level) and the aromatic content of the feedstock. The addition thereof may be continuous or intermittent.

The discoveries associated with the invention and relating to the solution of the above problems, and the objects achieved in accordance with the invention as set forth herein include the provision of:

The process which comprises subjecting a hydrocarbon substrate consisting mainly of normal saturated hydrocarbons of 10 to 30 carbon atoms to oxidation with molecular-oxygen containing gas in the presence of ortho-boric acid or a lower hydrate of ortho-boric acid in finely divided solid form, hydrolyzing the reaction mixture residue and recovering alcohol therefrom, said substrate containing from 0.2 to 10% by weight of aromatic hydrocarbons, said lower hydrate of ortho-boric acid being added portionwise or continuously in an amount equal to at least one mole of boron per 3 moles of product alcohol and the addition thereof being in a programmed manner at an amount per 100 grams of substrate for a reaction temperature in the range of 145° to 175° C. and per 100 millimoles of oxygenated organic compound produced having a maximum in the range of 200 to 22 millimoles calculated as boron, said maximum being highest for the lowest aromatic content and lowest for the highest aromatic content in said substrate and said maximum being selected so that oxidation proceeds with good selectivity to alcohol as ultimate product;

Such a process wherein ortho-boric acid is recovered from the hydrolysis reaction mixture, dehydrated, and recycled to the oxidation reaction step;

Such a process wherein the saturated hydrocarbon in the substrate is a mixture of normal paraffins of 11 to 14 carbon atoms;

Such a process using a mixture of saturated hydrocarbons containing at least 3% aromatics as impurity;

Such a process wherein the saturated hydrocarbon in the substrate is a mixture containing 11 to 14 carbon atoms;

Such a process including removing unreacted hydrocarbon and a ketone containing fraction from the reaction mixture and recycling them to the oxidation step, and wherein a mixture of secondary alcohols is recovered as the product;

Such a process which comprises subjecting a batch of normal paraffins of 11 to 14 carbon atoms containing 1.5 to 10% by weight aromatics to oxidation with molecular oxygen containing gas in the presence of a lower hydrate of ortho-boric acid and unreacted hydrocarbon and also ketone from a previous reaction batch, and recovering alcohol from the reaction mixture residue;

Such a batch process wherein the aromatic content is 3%;

The process which comprises subjecting a hydrocarbon substrate consisting mainly of at least one normal saturated hydrocarbon of 10 to 30 carbon atoms to oxidation with molecular-oxygen containing gas in the presence of a lower hydrate of ortho-boric acid, separating an unreacted hydrocarbon fraction and recycling it to the oxidation step; and recovering alcohol from the reaction mixture residue, said substrate containing from 0.2 to 10% by weight of aromatic hydrocarbons, said lower hydrate of ortho-boric acid being present in finely divided solid form during the oxidation in an amount equal to at least one mole of boron per 3 moles of product alcohol and the introduction thereof being in a programmed manner at an amount per 100 grams of substrate for a reaction temperature in the range of 145° to 175° C. and per 100 millimoles of contained oxygenated organic compounds having a maximum in the range of 200 to 22 millimols calculated as boron, said maximum being highest for the lowest aromatic content and lowest for the highest aromatic content in said substrate and said maximum being selected so that oxidation proceeds with good selectivity to alcohol as ultimate product;

Such a process wherein the reaction mixture residue is hydrolyzed and ortho-boric acid is recovered from the hydrolysis reaction mixture and re-used in the oxidation reaction step in dehydrated form, the recycled hydrocarbon fraction including oxygenated hydrocarbon material;

Such a process wherein the conversion per pass is in the range of 10 to 30% and the fresh saturated hydrocarbon added is in the range of about 10 to 30% of the charge in the oxidation step;

Such a process using a mixture of saturated hydrocarbons containing at least 3% aromatics as impurity;

Such a process wherein the saturated hydrocarbon in the charge is a mixture of normal paraffins of 11 to 14 carbon atoms;

The process which comprises subjecting a batch of normal paraffins of 11 to 14 carbon atoms containing 1.5 to 10% by weight aromatics (aralkanes and the like) to oxidation with molecular-oxygen containing gas in the presence of a lower hydrate of ortho-boric acid and unreacted hydrocarbon and also ketone from a previous reaction batch, and recovering alcohol from the reaction mixture residue;

Such a batch process wherein the aromatic content is 3%;

And other objects will be apparent as details or embodiments of the invention are set forth hereinafter.

In order to indicate still more fully the nature of the present invention, the following examples of typical procedures are set forth in which parts and percents mean parts and percents by weights, respectively, unless otherwise indicated, it being understood that these examples are presented as illustrative only and they are not intended to limit the scope of the invention.

In a series of examples, a batch of n-paraffins (of 11 to 14 carbon atoms and containing about 3% aromatics) is charged to a glass kettle equipped with a heating mantle, agitator, pot thermometer, water trap and a water cooled condenser. Air is fed through a rotometer and sparger into the reaction mixture at a rate of 1.25 liters/min. at 70° C. and atmospheric pressure. The effluent gas is cooled in water cooled condenser and the condensate returned to the pot after trapping out water. The cooled effluent gas is passed through a Dry-Ice acetone trap into an integrating wet test meter and a slipstream of the meter effluent is dried (e.g., over magnesium sulfate), then analyzed for oxygen content. After heating to about 160° C., initiator is added and vent oxygen content is monitored. Upon achieving about 50% absorption of oxygen throughput, meta-boric acid additions are begun, and oxygen absorption and water-make are measured as a function of time and gas throughput, in the isothermal oxidation. After sufficient absorption of oxygen, the reaction mixture is rapidly cooled to room temperature. The product mixture is filtered and the filtrate concentrated by distillation to remove the bulk of paraffin at reduced pressure, and the residue is hydrolyzed. The distillate is analyzed for carbonyl, acid, ester and alcohol content. The last is usually negligible.

In the hydrolysis procedure, the residue from the concentration of oxidation products is refluxed for ½ hour in a stirred reactor with an equal volume of water. The aqueous layer is separated at 80° C. to prevent precipitation of boric acid, and the organic layer is treated with two ½ volume portions of water at reflux temperature to insure complete hydrolysis.

The hydrolyzed oil is then saponified by refluxing for 6 to 10 hours with a two-fold excess of 5 to 10% aqueous sodium hydroxide in a stirred pot. The caustic phase is decanted at about 60° C. and the organic phase is retained. Further purification may be effected by distillation to a temperature of 190° C. at 3 mm. Hg pressure. About 90% of the sample is collected as distillate. The distilled sample contains only 3% total ester, acid and carbonyl impurities on a paraffin free basis (total paraffin 1.4%).

Good results are obtained, as shown in the following table, wherein t-BHP is t-butylhydroperoxide and t-BP is t-butylperoxide, and k-t cyclohexanone, (4) includes esterified alcohol, (5) includes esterified acid, and (6) uses average feed molecular weight of 178 and no fractionation due to reactivity differences, and treats all acids as monobasic chain scission products of average molecular weight of 120, all products being regarded as monofunctional, and gross product calculations assume a pure paraffin input equal to gross feed weight. Net product calculations correct gross figures for actual feed content. In Example 4 the "*" indicates that the charge is 551 grams of overhead distillate from Example 3, and in Example 5 the "*" indicates that the charge is 413 grams of overhead distillate from Example 4. These distillates are not treated to remove ketone.

In these runs the product analysis and product data are shown in actual and in net form (i.e. corrected for content of particular item in feed), and the latter is the more important value.

| Ex. No. | Feed | | | | Conditions | | |
|---|---|---|---|---|---|---|---|
| | Fresh paraffin, gms. | Outside initiator, gms. | Meta boric acid, gms. | At Moles O₂ absorbed | Moles O₂ absorbed | Time, hr. | Temp., ° C. |
| 1 | 680 | 0.5-t-BP, 2.5 k-t. | 5 | 0.1 | 1.0 | 3 | 155–157 |
| | | | 10 | 0.49 | | | |
| 2 | 680 | 1.0-t-BP, 5.0 k-t. | 5 | 0.17 | 3.0 | 6.5 | 156–160 |
| | | | 10 | 0.43 | | | |
| | | | 10 | 0.84 | | | |
| | | | 10 | 1.2 | | | |
| | | | 10 | 1.7 | | | |
| 3 | 680 | 1.0-t-BP, 5.0 k-t. | 5 | 0.2 | 1.3 | 3.5 | 158–160 |
| | | | 10 | 0.4 | | | |
| | | | 10 | 0.6 | | | |
| 4 | * | None | 4 | | 1.0 | 2.5 | 158–160 |
| | | | 8 | 0.25 | | | |
| | | | 8 | 0.5 | | | |
| 5 | * | do | 3 | 0 | 1.7 | 1.5 | 159–160 |
| | | | 6.2 | 0.15 | | | |
| | | | 6.2 | 0.4 | | | |

| Ex. No. | Product analysis (moles) | | | | Calculated product data | | | |
| --- | --- | --- | --- | --- | --- | --- | --- | --- |
| | | | | | Mole Percent (6) | | | |
| | H₂O | Alcohol (4) | Carbonyl | Acid (5) | Conv. | Sel. to alcohol | Sel. carbonyl | Sel. to acid |
| 1 | 1.0 | 0.46 | 0.12 | 0.19 | 17 | 69 | 17 | 14 |
| 2 | 3.3 | 1.43 | 0.30 | 0.62 | 53 | 70 | 15 | 15 |
| 3 | 1.4 | 0.52 | 0.12 | 0.21 | 19 | 70 | 16 | 14 |
| 4 | 1.2 | ¹ 0.57 | 0.16 | 0.32 | 29 | 64 | 18 | 18 |
| | | ² 0.56 | 0.06 | 0.22 | 24 | 77 | 8 | 15 |
| 5 | 0.91 | ¹ 0.41 | 0.15 | 0.32 | 31 | 58 | 20 | 22 |
| | | ² 0.34 | 0.03 | 0.13 | 22 | 78 | 7 | 15 |

¹ Act. ² Net.

The oxidation initiation of a batch of C-11 to C-14 n-paraffins containing about 3% by weight aromatics (alkaryl compounds and the like) can not be achieved in the presence of 0.8 wt. percent of meta-boric acid, even in the presence of substantial quantities of external initiator at temperatures to 185° C. at atmospheric pressure using air. This may be due to inhibition by the aromatics in the feed.

The oxidation can, however, be performed by adding meta-boric acid portionwise to an already initiated oxidation using the present invention. At temperatures of 158° to 161° C. alcohol selectives of 63 to 77% can be obtained using air at atmospheric pressure as the oxidant. Alcohol selectively is independent of conversion in the 11% to 30% range under these conditions, and the resulting product can be upgraded to at least 95% alcohol content by distillation of hydrocarbon away from the borate ester, and hydrolysis and saponification of carboxylic esters. The use of oxidation feedstocks containing substantial proportions of recycle material eliminates the need for external initiator and facilitates oxidation; where one uses substantial portions of recycle material containing small amounts of oxygenated compounds, in particular ketones, more than 0.8% of meta-boric acid may be added prior to initiation of the reaction, with good results. For example operation at 25% conversion requires 25% fresh feed and 75% of recycle stock.

Normally it is desirable to achieve conversions of 10% to 30% or even 50% and desirably 10 to 25% for economic reasons.

In order to obtain the benefit of the boron-assisted oxidation there must be present at least 0.25 mole of boron per mole of hydrocarbon converted and desirably 0.4 to 1.0 mole. More than 1 mole of boron per mole of hydrocarbon converted generally gives no advantage. Therefore, in order to have the minimal quantity of boron available, for example, for oxidation of a C-12 paraffin to 15% conversion, about 1% by weight of meta-boric acid is required.

Oxidation of paraffins which contain 0.2 to 0.5% aromatics is inhibited by 1% or more meta-boric acid. Stocks containing more than 0.5% aromatics are generally impossible to oxidize in the presence of 1% or more meta-boric acid at conditions of temperature favorable to good selectivity even with added initiators, e.g., peroxides. Attempts to oxidize such a mixture at temperatures above 165° C. result in discoloration and agglomeration of meta-boric acid via surface fusion in the bulk of the reaction mixture. No agglomeration or discoloration of this mixture is observed under nitrogen after prolonged treatment at 175° C.; however, introduction of air to this mixture results in a rapid agglomeration and discoloration of the 1% meta-boric acid contained therein. This is true for other dehydration derivatives of ortho-boric acid, such as tetra-boric acid or boron oxide.

Oxidation of recycle containing feeds is performed as with new stocks except that "outside" initiator is unnecessary and the oxidation can be started in the presence of 0.8 wt. percent or more of meta-boric acid, depending on percentage recycle. Batch procedure runs using the above described conditions give comparably good results.

In an optional procedure, the entire overhead fraction is recycled, i.e., paraffins and ketones plus other materials. In such a recycle procedure, ketones reach a steady state concentration. Higher acids can be removed easily from the product alcohols by caustic treatment, while lower acids can be removed similarly from the overhead fraction. Thus, a difficult separation is avoided. Additional benefit from this process is obtained in the oxidation where the recycled ketone containing fraction promotes the oxidation leading to higher rates and shorter reaction times.

Through use of this improved process, normal saturated aliphatic hydrocarbons mixtures of 10 to 30 carbon atoms and containing more than 0.5% aromatics may be efficiently oxidized, e.g., up to 10% or more aromatics. This eliminates the need for costly treatment to remove such aromatics from many available stocks.

In general, it is desirable to maintain the partial pressure of water below 30 p.s.i.a. and more desirable to have it below 10 p.s.i.a., e.g. down to 0.5 p.s.i.a. This is accomplished by adjusting the system pressure and percentage of oxygen in the feed gas. Normally the partial pressure of water is 1.0 to 1.5 times the partial pressure of reacted oxygen. This is calculated as: (Total pressure minus vapor pressure of substrate) times (percent oxygen in feed minus percent oxygen in vent).

The amount of boron compound employed depends on the conversion level to be achieved in the oxidation. There should be at least 1 mole of boron per 3 moles of product monohydric alcohol. Since the selectivity to alcohol is usually of the order of 70% this means there should be present at least 1 mole of boron for every 4.3 moles of hydrocarbon converted. Desirably one employs 0.5 to 1 mole of boron per mole of hydrocarbon converted. Temperatures are broadly 120° to 210° C. A lower hydrate of ortho-boric acid is maintained in admixture with the reactants during the oxidation reaction. Preferred lower hydrates are meta-boric acid, tetra-boric acid, boron oxide, or mixture thereof. By lower hydrate is meant a dehydration derivative of ortho-boric acid. Finely divided boric acid may be employed, however, under the conditions of reaction it will rapidly dehydrate to primarily meta-boric acid in finely divided solid form and thus the active agent is meta-boric acid.

The process is carried out continuously or batchwise. The pressure in the oxidation may be 0.1 atmosphere or higher, e.g., up to 250 p.s.i.g. or above.

The oxygen concentration in the inlet gas may be 3 to 30% or more, and spent gas may be recycled if desired; after enriching the oxygen therein, in known manner.

The maximum rate of addition of the meta-boric acid or equivalent material (preferably in finely-divided form as obtained by dehydration of ortho-boric acid in the presence of a hydrocarbon) is related to the conversion of the hydrocarbon, the amount of boric material combined with product alcohol (or which gives alcohol on hydrolysis) and the surface area of the meta-boric acid present. This area is greatest per unit weight for the preferred finely-divided material. The amount of boron present at any time should not be more than 200 to 22 millimoles (gram) per 100 grams of substrate and per 100 millimoles of contained oxygenated organic compounds in the presence of an excess of 0.5 aromatic calculated as benzene. The actual amount is selected so that the desired oxidation proceeds, at the selected reaction temperature in the range of 145° to 175° C. Outside this range, the process is inoperative or impractical.

The process of this invention is applicable to the oxidation of a wide variety of hydrocarbons. The invention is especially suitable in system involving the oxidation of normal saturated aliphatic hydrocarbons of 10 to 30 carbon atoms, such as n-decane, n-undecane, n-dodecane, and the like straight-chain materials or mixture thereof.

In view of the foregoing disclosures, variations and modifications thereof will be apparent to one skilled in the art, and it is intended to include with the invention all such variations and modifications except as do not come within the scope of the appended claims.

What is claimed is:

1. The process which comprises subjecting a normal paraffin hydrocarbon substrate consisting mainly of at least one normal paraffin of 10 to 30 carbon atoms and containing from 0.2 to 10% by weight of aromatic hydrocarbons to molecular oxygen oxidation at a temperature of 145° to 175° C. in the presence of a less hydrated form of boric acid, hydrolyzing the reaction mixture residue and recovering alcohol therefrom, said less hydrated form of boric acid being added in finely divided solid form after initiation of the oxidation in a total amount equal to at least one mole of boron per 3 moles total product alcohol formed during the oxidation, the said less hydrated form of boric acid being added portionwise or continuously at a rate which is dependent upon the extent of oxygen absorption and the aromatic content of the substrate and which has a maximum of 200 to 22 millimols calculated as boron per 100 grams of substrate and per 100 millimols of oxygenated organic compounds contained in said substrate during said oxidation, said maximum being highest for the lowest aromatic content and lowest for the highest aromatic content in said substrate.

2. A process of claim 1 wherein ortho-boric acid is recovered from the hydrolysis reaction mixture, dehydrated, and recycled to the oxidation reaction step.

3. A process of claim 2 wherein the saturated hydrocarbon in the substrate is a mixture of normal paraffins of 11 to 14 carbon atoms.

4. A process of claim 1 using a mixture of saturated hydrocarbons containing at least 3% aromatics as impurity.

5. A process of claim 4 wherein the sautrated hydrocarbon in the substrate is a mixture containing 11 to 14 carbon atoms.

6. A process of claim 1 including removing an unreacted hydrocarbon fraction containing ketone from the reaction mixture and recycling it to the oxidation step, and wherein a mixture of secondary alcohols is recovered as the product.

7. A process of claim 1 which includes subjecting a batch of normal paraffins of 11 to 14 carbon atoms containing 1.5 to 10% aromatics to oxidation with molecular-oxygen containing gas in the presence of a lower hydrate of ortho-boric acid and unreacted hydrocarbon and also ketone from a previous reaction batch, and recovering alcohol from the reaction mixture residue.

8. A process of claim 7 wherein the aromatic content is at least 3%.

References Cited

UNITED STATES PATENTS

| | | |
|---|---|---|
| 1,947,989 | 2/1934 | Hellthaler et al. |
| 3,238,238 | 3/1966 | McNamara et al. ____ 260—639 |
| 3,239,552 | 3/1966 | Feder et al. |
| 3,243,449 | 3/1966 | Winnick. |
| 3,275,695 | 9/1966 | Marcell. |

OTHER REFERENCES

Marly: "Chem Abstracts," 1960, p. 16,877.

Bashkirov et al.: "World Petr. Congress," 5th Proceedings, New York, 1959, vol. 4, pp. 175–83.

BERNARD HELFIN, *Primary Examiner.*

J. E. EVANS, *Assistant Examiner.*

U.S. Cl. X.R.

260—410.9, 412, 413, 533, 597, 643

UNITED STATES PATENT OFFICE
CERTIFICATE OF CORRECTION

Patent No. 3,442,959                                                May 6, 1969

Gerald Sugerman

It is certified that error appears in the above identified patent and that said Letters Patent are hereby corrected as shown below:

Column 1, line 15, "oxidation of paraffins having 10 to 30 carbon atoms and" should read -- oxidation is carried out using less hydrated forms of boric --. Columns 3 and 4, in the table, sub-heading to the fourth column, line 1 thereof, "$O_3$" should read -- $O_2$ --.

Signed and sealed this 14th day of April 1970.

(SEAL)
Attest:

Edward M. Fletcher, Jr.                                WILLIAM E. SCHUYLER, JR.
Attesting Officer                                                 Commissioner of Patents